United States Patent [19]

Nilsson

[11] Patent Number: 4,571,666
[45] Date of Patent: Feb. 18, 1986

[54] D.C-D.C. CONVERTER FOR CONVERTING AN UNSTABILIZED D.C.-VOLTAGE TO THREE STABILIZED D.C.-VOLTAGES

[75] Inventor: Sten V. Nilsson, Askim, Sweden

[73] Assignee: Telefonaktiebolaget LM Ericsson, Stockholm, Sweden

[21] Appl. No.: 598,312
[22] PCT Filed: Jul. 1, 1983
[86] PCT No.: PCT/SE83/00267
§ 371 Date: Mar. 6, 1984
§ 102(e) Date: Mar. 6, 1984
[87] PCT Pub. No.: WO84/00449
PCT Pub. Date: Feb. 2, 1984

[30] Foreign Application Priority Data

Jul. 12, 1982 [SE] Sweden .................................. 8204284

[51] Int. Cl.⁴ .............................................. H02M 3/24
[52] U.S. Cl. ........................................ 363/15; 307/11; 363/72
[58] Field of Search .................... 363/15, 16, 25, 26, 363/71, 72, 67; 323/267; 307/11, 31

[56] References Cited

U.S. PATENT DOCUMENTS 3,571,692  3/1971  Andren .................................. 363/16
3,852,655 12/1974  Justice .................................. 363/71
4,449,173  5/1984  Nishino et al. ....................... 323/267

FOREIGN PATENT DOCUMENTS 826320  5/1981  U.S.S.R. ................................. 363/15

Primary Examiner—William H. Beha, Jr.
Attorney, Agent, or Firm—Roberts, Spiecens & Cohen

[57] ABSTRACT

A DC-DC converter converts an incoming unstabilized D.C. voltage to three stabilized output D.C. voltages. The converter contains two chopper stages (1, 2) with associated transformers, rectifiers (3, 4, 17a, 17b) and smoothing filters (5, 6, 18). The two chopper stages give a first and a second pulse-formed output voltage ($U_a$ and $U_b$) which are regulated by shifting the leading edge of the pulses in the first output voltage ($U_a$), while the second output voltage ($U_b$) is regulated by shifting the trailing edge of the pulses. Two output voltages ($U_1$, $U_2$) are obtained after recitfying and smoothing. The third output voltage is obtained by connecting in parallel the outputs of two full-wave rectifiers (17a, 17b) which are magnetically coupled to the outputs of the two chopper steps, and by connecting a smoothing filter (18) to the common output of both full wave rectifiers. Regulation of the third output voltage ($U_3$) is obtained by varying the phase position (o) between the first and the second chopper output voltage ($U_a$, $U_b$).

3 Claims, 3 Drawing Figures 4,571,666

D.C.-D.C. CONVERTER FOR CONVERTING AN UNSTABILIZED D.C.-VOLTAGE TO THREE STABILIZED D.C.-VOLTAGES

FIELD OF INVENTION

The present invention relates to a D.C. converter for converting an unstablized incoming D.C. voltage to three stablized output D.C. voltages with the use of two chopper circuits. Such a converter can be used as the power source for a current supply to electronic equipment, especially airborn equipment where there is a demand for low weight and volume.

BACKGROUND

In power supply units with a high power output which is to be distributed to several loads, it is known in the art to utilize a D.C.-A.C. converter and to provide the converter with a transformer having a plurality of secondary windings, rectifiers and series regulators being connected to the secondary windings, as in U.S. Pat. No. 4,024,451, for example. Series regulation of the output voltages results in relatively high losses, and thereby lower efficiency, as well as in the limiting of power capacity. To avoid this, three separate converters must be used for higher power level, which of course increases the weight of the power supply unit.

SUMMARY OF INVENTION

An object of the present invention is to provide a D.C. converter of the kind mentioned above, which has as few component parts as is possible with respect to the number of obtained output voltages.

In accordance with the invention, there are employed two chopper stages with associated transformers, rectifiers and smoothing filters, to provide three independent D.C. voltage outputs with output power of the same order of magnitude. After rectifying and smoothing, the two chopper stages give a first and a second output voltage which is regulated by shifting the leading edge of the pulses in the first pulse-formed output voltage, while the second output voltage is regulated by shifting the trailing edge of the pulses in the second pulse-formed output voltage. A third output voltage is obtained by connecting the first and the second pulse-formed output voltages in parallel after rectifying and before smoothing. This output voltage can be kept constant and dependent on the other two output voltages, providing that both the first and the second output voltages work with overlapping in the respective controlled edge. Regulation of the third output voltage is obtained by varying the phase position between the first and the second chopper output voltage.

BRIEF DESCRIPTION OF DRAWINGS

The invention will next be described in detail with reference to the appended drawings, wherein.

DETAILED DESCRIPTION

Figure 1:
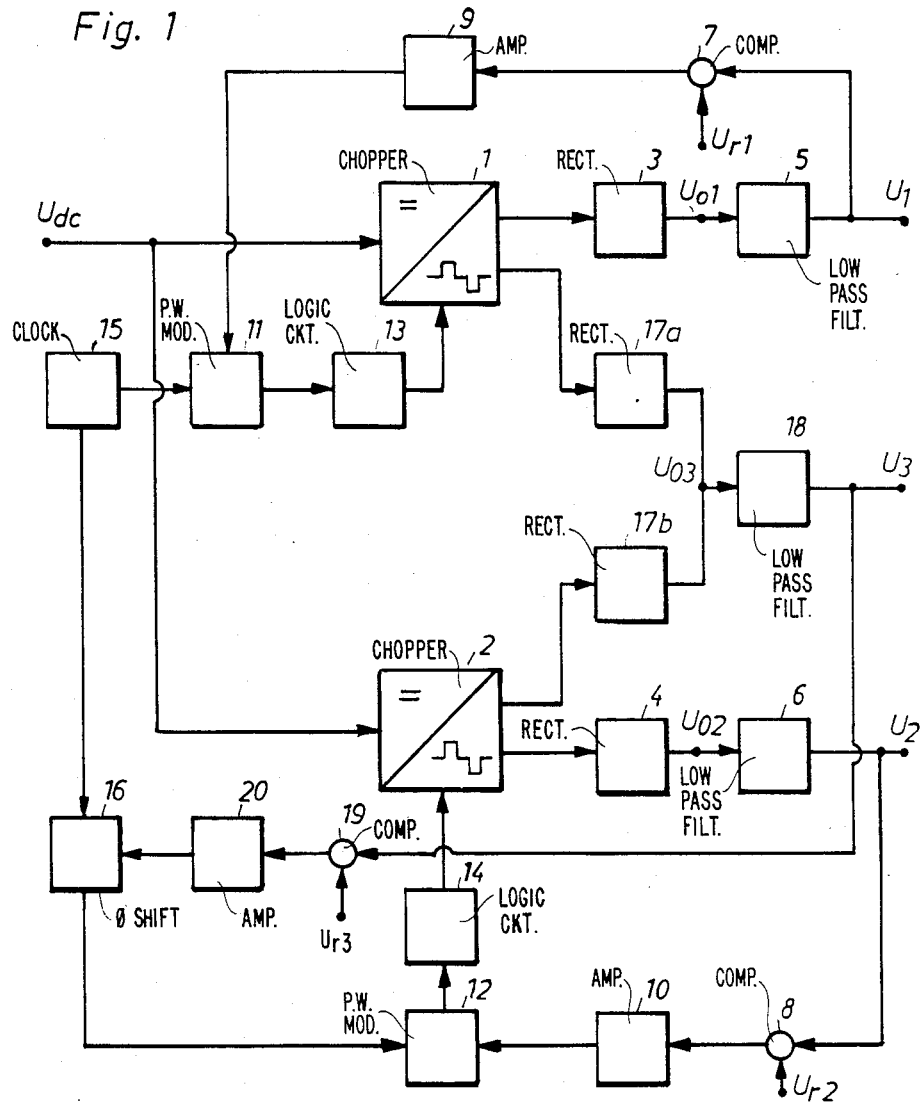
FIG. 1 is a block diagram of a D.C.-D.C. converter in accordance with the invention, FIG. 2 more closely illustrates the transformer stage, together with rectifier and smoothing filter incorporated in the converter according to FIG. 1.
Figure 3:
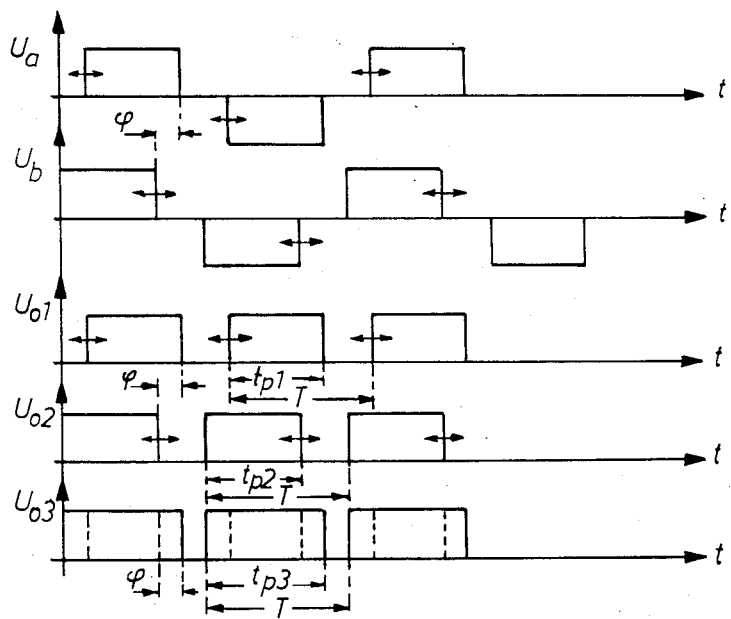
FIG. 3 is a time chart.

The incoming unstabilized D.C. voltage is denoted as Udc in the block diagram according to FIG. 1. The converter of the invention contains two chopper stages 1 and 2, which receive the D.C. voltage Udc and conventionally convert this voltage to a square-wave pulse train with a given frequency $f_O$. For this purpose the chopper circuit 1 is controlled by a clock circuit 15, which sends control pulses with the frequency $f_O$ to the chopper stage 1 via a pulse width modulator 11 and a logic circuit 13. After rectification in a rectifier 3, a pulse-formed output voltage Uol (illustrated in FIG. 3) is obtained, and the output D.C. voltage $U_1$ is obtained after smoothing in a lowpass filter 5. The voltage $U_1$ is compared with a reference voltage Url in a comparison circuit 7, and the difference voltage is transmitted via an amplifier 9 to the control input of the pulse width modulator 11, for varying the pulse width of the control pulse sent to the chopper step 1, in response to the magnitude of the difference signal from the comparator 7. In this arrangement the pulse width is varied with the aid of the logic circuit 13 by varying the leading flank of the control pulses, while the trailing flank position is fixed. The frequency $f_o$ is constant for the whole time, and is determined by the clock circuit 15.

Control pulses are sent to the chopper stage 2 in a similar manner from the clock circuit 15 via a phase shifter 16, a pulse width modulator 12 and a logical circuit 14. After the pulse-formed output voltage from the chopper step 2 has been rectified in a rectifier 4, a pulsing D.C. voltage $U_{02}$ is obtained, which is smoothed in a lowpass filter 6 to give an output D.C. voltage $U_2$. This is compared with a reference voltage $U_{r2}$ in a comparator 8, and the difference voltage thus obtained is supplied to the pulse width modulator 12 via an amplifier 10. The control pulses to the chopper step 2 are pulse width regulated with the aid of the pulse width regulator 12 and the logical circuit 14, so that the trailing edge is varied in response to the value of the difference voltage from the comparator 8, as will be seen from the time chart in FIG. 3, where the indicating arrows denote, for the respective chopper step, which flank of the obtained output voltage $U_{01}$, $U_{02}$ is varied in the pulse width regulation process. A given phase shift $\phi$ between the pulse-formed output voltages $U_{01}$ and $U_{02}$ is furthermore obtained with the aid of a phase shifting circuit 16.

The two pulse-formed output voltages from the chopper stages 1 and 2 each feed a half-wave rectifier 17a and 17b. The two D.C. voltages are connected in parallel, and together form the voltage $U_{03}$, which is smoothed in a following lowpass filter 18 so that the output voltage $U_3$ is obtained. A comparison circuit 19 is connected to the output of the smoothing filter for comparing the output voltage $U_3$ with a reference voltage $U_{r3}$, a difference voltage being obtained across the output of the comparison circuit, the output being connected to an amplifier 20. The output of the amplifier 20 is connected to a control input of the phase-shifting circuit 16 for phase-shifting, in response to the magnitude of the amplified difference signal, the clock pulses which are supplied to the phase-shifting circuit 16 from the clock circuit 15. As will be seen from FIG. 3, the pulse width of the rectified output voltage $U_{03}$ will be varied by varying the phase angle $\phi$ in response to the difference signal from the comparison circuit 19. The mean value of the output voltage $U_{03}$ may thus be varied and regulation of the third output voltage $U_3$ from the DC-DC converter is obtained. This regulation of the output voltage $U_3$ does not affect the regulation of the two other output voltages $U_1$ and $U_2$, since only the trailing and the leading edges of both rectified output voltages $\overline{U}_{01}$, $U_{02}$ are varied, which does not affect the output voltage $U_{03}$. A condition is, however, that the phase relationship of $U_{01}$ and $U_{02}$ is such that both these voltages overlap each other at the respective controlled edge. The following applies for the output voltages $U_1$, $U_2$ and $U_3$ in the case where the lowpass filters 5, 6, 18 are formed as LC-filters:

$$U_1 = \frac{tp1}{T} \cdot \hat{U}_{o1}$$

$$U_2 = \frac{tp2}{T} \cdot \hat{U}_{o2}$$

$$U_3 = \frac{tp3}{T} \cdot \hat{U}_{o3}$$

where the time intervals $tp_1$ and $tp_2$ are varied with the aid of shifting the respective trailing and leading edges of the voltage pulses during each period. The logic circuits 13 and 14 may possibly be implemented such that the trailing or leading edge of only one pulse is varied, or that the variation is performed only during definite periods so that, for example the trailing (or the leading) edge for each fourth pulse is varied. The time interval $t_{p3}$ is varied by the phase angle between the pulses in the output voltages $U_{01}$ and $U_{02}$ being varied.

Figure 2:
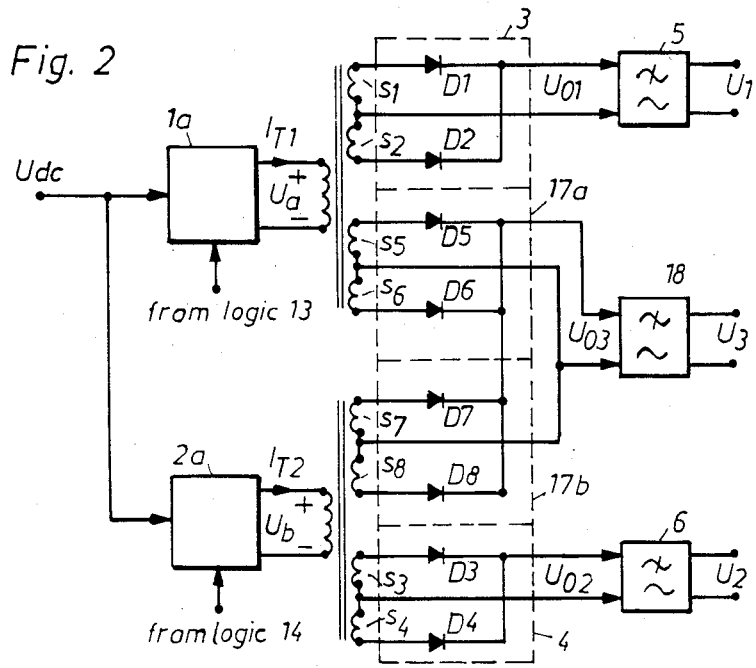

FIG. 2 more closely illustrates the transformer stage in the two chopper stages 1 and 2, as well as the connection to the following rectifiers. The blocks 1a and 2a are included in the respective chopper stage, and symbolize the conventional circuits performing the switching of the incoming D.C. voltage Udc, for obtaining the pulse-formed primary voltages $U_a$ and $U_b$ (according to FIG. 3) across the respective primary winding. The rectifiers 3 and 4 are constructed as rectifiers of a kind known per se, each containing two secondary winding parts $s_1$, $s_2$ and $s_3$, $s_4$, respectively, with associated diodes D1, D2 and D3, D4. The rectifiers 17a and 17b are each built up from two full-wave rectifiers connected in parallel, of which one contains the secondary winding parts $s_5$, $s_6$ and diodes D5, D6 while the others contain the secondary winding parts $s_7$, $s_8$ and diodes D7, D8. The connection in parallel of the full-wave rectifiers 17a, 17b to the chopper stages 1 and 2, respectively, results in that the chopper steps 1 and 2 share the load current to the commonly supplied output voltage $U_3$. The three output voltages $U_1$, $U_2$ and $U_3$, as well as the loads, can be dimensioned independent by from each other and may be expanded to an optimum number of output voltages.

Three independent D.C. outputs are obtained with the proposed D.C.-D.C. converter. The three D.C. voltages over these outputs can be regulated independent by of each other with the aid of only two chopper stages and two transformers together with the associated control circuits.

What is claimed is:
1. A D.C.-D.C. converter for converting an incoming unstablized D.C. voltage (Udc) to at least three stablized output D.C. voltages ($U_1$, $U_2$, $U_3$) and comprising
  (a) a first chopper stage, (1) a first pulse width modulator, a first rectifier-filter combination (3,5) coupled to said first chopper stage for forming a first output voltage ($U_1$) a feed-back loop (7,9,11,13) including a comparator and coupling said rectifier-filter combination to said first pulse width modulator (11) for regulating pulse width in response to comparison in said comparator between the first output voltage and a reference voltage ($U_{r1}$),
  (b) a second chopper stage (2), a second rectifier-filter combination coupled to said second rectifier-filter combination (4,6) for forming a second output voltage ($U_2$), a second pulse width modulator, a second feed-back loop (8,10,12,14) including a comparator and coupling said rectifier-filter combination to said second pulse width modulator (12) for regulating pulse width in response to comparison between the second output voltage ($U_2$) and a second reference voltage ($U_{r2}$),
  (c) a clock circuit (15) coupled to and controlling the first and second pulse width modulators (11,12), logical circuits (13,14) connected to the respective pulse width modulators (11,12), said logical circuits being adapted for controlling first and second chopper stages (1,2) so that the leading edge of the output voltage (Ua) of the first chopper stage and trailing edge of the output voltage (Ub) of the second chopper stage are varied for said regulation of pulse width, and such that said edges overlap each other, a third rectifier-filter combination, the pulse width modulated output voltages from the first and second chopper stages (1,2) being connected in parallel to said third rectifier-filter combination (17a,17b,18) the output voltage of which forms the third output voltage ($U_3$) of the converter, and a phase shifting circuit (16) connected between the clock circuit (15) and the second pulse width modulator (12) for varying the phase position between the output voltages from the first and the second chopper stages (1,2) and thereby the third output voltage ($U_3$) in response to a comparison between the latter said output voltage and a third reference voltage ($U_{r3}$).

2. A converter as claimed in claim 1, wherein the third rectifier-filter combination comprises a first and a second rectifier (17a, 17b) and a lowpass filter (18), the respective rectifier input being magnetically coupled to the respective output of the first and second chopper stages (1,2), and the outputs of the rectifiers are commonly connected to the input of the lowpass filter (18).

3. A converter as claimed in claim 2, said first and second rectifiers are full-wave rectifiers.

* * * * *